(12) United States Patent
Rieger

(10) Patent No.: US 8,206,480 B2
(45) Date of Patent: Jun. 26, 2012

(54) AIR FILTER UNIT WITH AT LEAST ONE MAIN AIR FILTER AND AN AUXILIARY FILTER

(75) Inventor: Mario Rieger, Freiberg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 699 days.

(21) Appl. No.: 12/301,671

(22) PCT Filed: Apr. 18, 2007

(86) PCT No.: PCT/EP2007/053760
§ 371 (c)(1),
(2), (4) Date: May 28, 2009

(87) PCT Pub. No.: WO2007/137911
PCT Pub. Date: Dec. 6, 2007

(65) Prior Publication Data
US 2010/0043638 A1    Feb. 25, 2010

(30) Foreign Application Priority Data
May 29, 2006  (DE) .......................... 10 2006 025 231

(51) Int. Cl.
*B01D 59/50*  (2006.01)

(52) U.S. Cl. ................ 55/482; 55/483; 55/485; 55/486; 55/487; 55/488; 55/489; 55/385.3; 55/385.1; 55/520; 55/498; 95/287; 123/198 E

(58) Field of Classification Search ............ 55/482–483, 55/485–489, 385.3, 385.1, 520, 521, 498; 95/287; 123/198 E
See application file for complete search history.

(56) References Cited

U.S. PATENT DOCUMENTS

| | | |
|---|---|---|
| 3,722,186 A | 3/1973 | Parker |
| 5,147,430 A | 9/1992 | Kidd |
| 5,318,608 A | 6/1994 | Boone |
| 5,820,646 A * | 10/1998 | Gillingham et al. ............ 55/488 |
| 2002/0152732 A1 * | 10/2002 | Kallsen et al. .................. 55/482 |
| 2004/0089154 A1 | 5/2004 | Le |
| 2006/0091084 A1 | 5/2006 | Merritt |

* cited by examiner

Primary Examiner — Jason M Greene
Assistant Examiner — Dung H Bui

(57) ABSTRACT

In an air filter unit (10) comprising at least one main air filter (1) and an auxiliary air filter (2) that is connected by an air conduit (3) to the main air filter (1) and has at least one auxiliary filter element, the auxiliary filter element is formed, at the unfiltered air side of the main air filter (1), by an at least partially porous wall of the air conduit (3) closed off at the intake side. In the reverse case, when installing at the filtered air side, the auxiliary filter element is arranged within the air conduit connected to the main air filter.

7 Claims, 2 Drawing Sheets

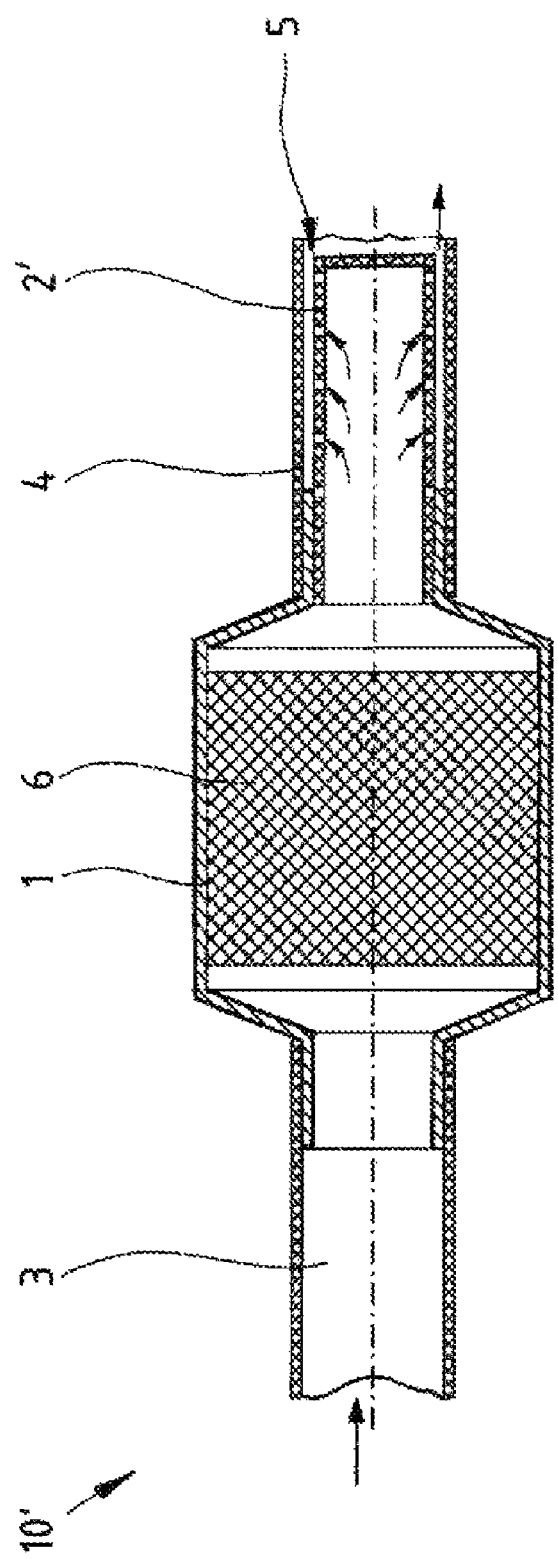

AIR FILTER UNIT WITH AT LEAST ONE MAIN AIR FILTER AND AN AUXILIARY FILTER

Figure 1:
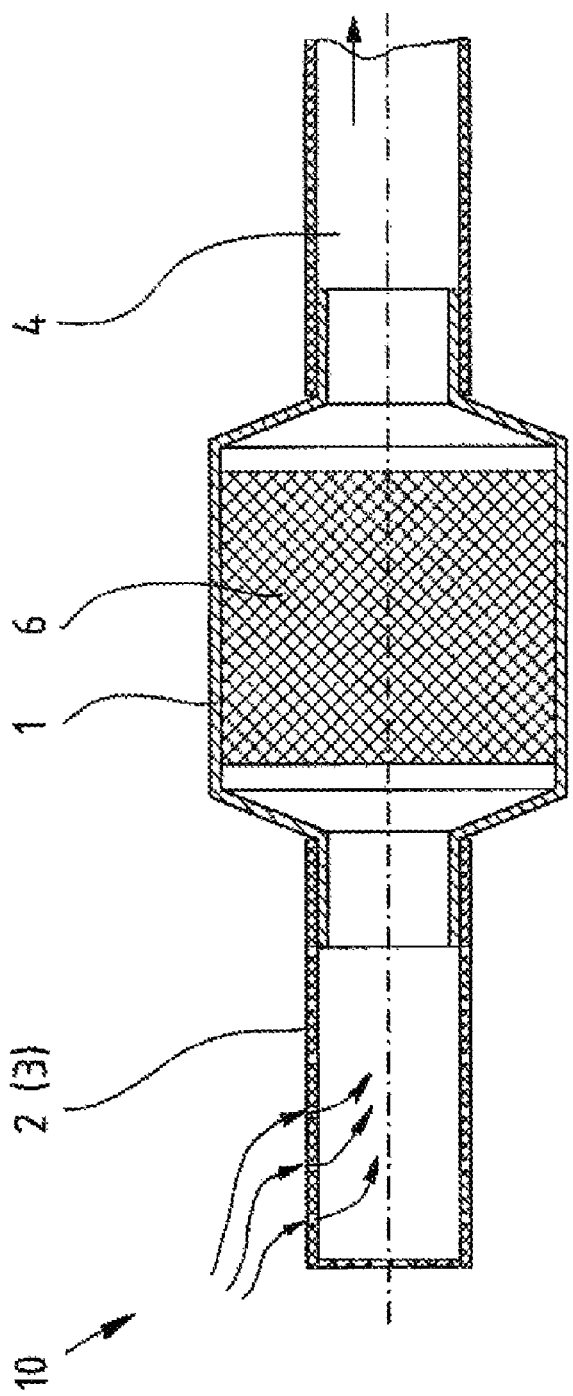

The invention concerns an air filter unit comprising at least one main air filter and an auxiliary air filter that is connected by an air conduit to the main air filter and comprises at least one auxiliary filter element.

In case of air filter elements, in particular those that are provided for use in the intake area of an internal combustion engine, it is possible to provide at the intake and/or outlet side an additional filter medium in addition to the main air filter element. When arranged at the intake side, it acts as a pre-separator for coarse dirt particles. At the outlet side it can be provided as a safety element in order to provide safety in case that the main air filter element is damaged and thus a flow of dirty air is possible past the filter medium. The safety element prevents also dust introduction at the filtered side when changing the main element. In case of conventional round filters the auxiliary element can be easily integrated in that it is arranged in the interior or at the circumference of the annular filter element. In particular in the case of wound compact air filters the size is however optimized in that in the interior there is no longer any empty space enclosed by the filter medium that could be used for the auxiliary filter element.

It is an object of the invention to supplement in an air filter unit of the aforementioned kind the main air filter in a space-saving way with an auxiliary filter as a pre-separator and/or as a safety filter.

A further object of the invention is to supplement in an air filter unit of the aforementioned kind the main air filter in a space-saving way with an auxiliary air filter as a safety filter.

According to the invention in both embodiments it is thus proposed to embody at the unfiltered air side and/or the filtered air side the air conduit itself over at least part of its length as a filter element. For this purpose, the wall of the air conduit is embodied to be so porous that a satisfactory filtering action of the intake air is ensured. These auxiliary filters in the form of a conduit in both applications are closed off at their end so that air can only flow through the porous wall into the interior of the air conduit. The filter medium can be surrounded by a conduit in order to take in air at one specific location.

In the case of arrangement at the filtered air side the porous wall is provided with a seal-tight cover or is positioned within the filtered air conduit by leaving an annular gap in order to conduct the filtered air completely to the consumer. The filtered air then passes from the main filter into the auxiliary filter in the form of a conduit, passes through its porous wall into the annular gap underneath the cover or underneath the wall of the filtered air conduit and then flows through the additional filtered air conduit to the consumer.

The closure at the end can be realized by means of a filter medium, for example, a nonwoven, inserted into the conduit. A non-woven or the like can also be positioned additionally at other locations within the air conduit.

In a preferred embodiment, both flow paths have arranged thereat an auxiliary filter element. In this way, not only the afore described function as a pre-separator or safety element in case of failure of the main filter is fulfilled but also an additional shielding of the flow paths is provided when, for example, an exchange of the air filter insert element is carried out outside of a shop building in the field and the main air filter housing is opened for this purpose.

Accordingly, the embodiment according to the invention of an air filter unit is suitable in particular for off-road vehicles or for military vehicles.

The invention will be explained in the following with reference to the drawing in more detail. The figures show in a schematic section view in:

FIG. 1 an air filter unit with auxiliary filter at the unfiltered air side; and

FIG. 2 an air filter unit with auxiliary filter at the filtered air side.

FIG. 1 shows a first air filter unit 10 whose main filter 1 comprises a main filter element 6 in a housing. The flow direction is indicated by arrows.

The housing has at both ends connecting sockets onto which in particular hose-shaped air conduits 3 and 4 are pushed. On the unfiltered air side, in FIG. 1 to the left of the main filter 1, the air conduit 3 is provided with a porous wall so that the air conduit 3 itself forms an auxiliary filter element 2. The auxiliary filter element 2 is closed off at the end. Sucked-in air can flow therefore only through the pores from the exterior to the interior into the auxiliary filter element 2 as indicated in FIG. 1 by the arrows. In this way, coarse dirt particles are separated. Even for small hose diameters a relatively large filter surface area is available that can be varied across the length of the auxiliary filter element 2. When the auxiliary filter element 2 is embodied as a hose, it can be arranged easily in an engine compartment without requiring additional space.

FIG. 2 shows the reverse situation in which at the intake side an air conduit 3 with a tight wall is provided that is connected e.g. to an air intake socket. In this embodiment, an auxiliary filter element 2' is arranged at the filtered air side to the right in the illustration which is again embodied as a conduit closed off at the end and comprised of a porous wall. In contrast to the first embodiment, there is also an envelope provided in order to prevent escape of filtered air to the exterior as well as penetration of fine dust to the filtered air side. Air exits from the main filter 1, passes in the interior into the auxiliary filter element 2', exits through its pores in the wall, reaches an annular gap 5 between the auxiliary filter element 2' and the filtered air conduit 4 and then flows in the latter to the connected consumer. In case of damage or opening of the housing of the main air filter 1 at least coarse particles will be separated in the downstream auxiliary filter element 2' so that a residual protection of the consumer, in particular an internal combustion engine, is provided until a repair can be carried out. The same holds true in case when the main air filter element 6 fails or has accidentally not been replaced in a servicing procedure.

In some embodiments the main air filter 1 may include a compact air filter element. Compact air filter elements are known in the art, examples including United States Patent Application Publications 2004/0060861 and 2007/0251201. The compact air filter element is wound from at least one corrugated layer and at least one flat layer of a filter medium. The filter medium layers are connected layer by layer alternating at their lateral edges by means of pasty adhesive beads that close off one end of the channels that are formed between the corrugated and the planar layers of the filter element.

The invention claimed is:

1. Air filter unit (10') comprising
   at least one main air filter (1) and
   an auxiliary air filter that is connected by means of an air conduit (4) to the main filter (1) and comprises
      at least one auxiliary filter element, the at least one auxiliary filter element (2') arranged inside a filtered air conduit (4), wherein the auxiliary filter element is formed by an at least partially porous wall of an auxiliary air conduit (2') closed off at an end such that airflow entering an interior of the auxiliary air conduit (2') can only flow through the at least partially porous wall to exit the auxiliary air conduit (2'), said auxiliary air conduit arranged at a filtered air side of the main air filter (1) within the air conduit (4) connected to the main air filter (1), wherein filtered airflow exiting the main filter (1), passes in an interior of the auxiliary filter (2') formed by the at least partially porous wall of the auxiliary air conduit (2'), flows though pores in the at least partially porous wall, reaches a gap (5) between the auxiliary air filter (2') and the filtered air conduit (4), then flows along the gap (5) to exit the air filter unit (10').

2. Air filter unit according to claim 1, wherein
the air conduit (4) and/or the auxiliary conduit (2') are formed as a corrugated pipe.

3. Air filter unit according to at least one of the claims 1 or 2, wherein
the air conduits (2', 3', 4) are embodied as flexible hoses.

4. Air filter unit according to at least one of the claim 1 or 2, wherein
the main air filter (1) comprises
at least one compact air filter element that is wound from at least one corrugated layer and at least one flat layer of a filter medium,
wherein the layers are connected layer by layer alternatingly at their lateral edges by means of pasty adhesive beads that close off one end of channels that are formed between the corrugated and planar layers.

5. Air filter element according to claim 4, wherein
the cross-section of the air conduits is filled at least across a part of the conduit length with a partially permeable filter medium.

6. Air filter unit with two auxiliary air filters according to claim 1.

7. Air filter element according to claim 1, wherein
the gap between the auxiliary air filter (2') and the filtered air conduit (4) is an annular airflow gap defined by and between the radial outside of the auxiliary air filter (2') and inner side of the filtered air conduit (4).

* * * * *